Dec. 2, 1930.  W. J. HOGG ET AL  1,783,541
TOOL HOLDER
Filed April 28, 1928

Inventors,
William J. Hogg
Frederick Neumann
by their Attorney

Patented Dec. 2, 1930

1,783,541

UNITED STATES PATENT OFFICE

WILLIAM J. HOGG AND FREDERICK NEUMANN, OF CLEVELAND, OHIO, ASSIGNORS TO THE NATIONAL ACME COMPANY, OF CLEVELAND, OHIO, A CORPORATION OF OHIO

TOOL HOLDER

Application filed April 28, 1928. Serial No. 273,516.

This invention relates to tool holders adapted to hold the shanks of different types of tools, the object of the invention being to provide a positive gripping tool holding device which, while adapted for holding box tools, reamers, taps, etc., and useful on various types of machines, either automatic or hand, and even on a lathe, is particularly adapted for use in holding the shanks of threading tools, such as threading dies.

A further object of the invention is the provision of an improved tool holding device, simple in construction, inexpensive to manufacture, positive in action, and which will hold the tool securely in place without the mutilation of the shank of the tool, and at the same time permit the tool shank to be readily and quickly inserted or replaced and insure the same location of the tool shank in the spindle on each replacement thereof.

In the use, for instance, of the ordinary self-opening threading die, such as those used with a "Gridley" multiple spindle automatic, the die shank is usually held in the spindle of the machine by three screws carried by the tool spindle and which bear directly on the shank of the die head or upon a bushing between the shank and the spindle when the shank is smaller than the bore of the die spindle. These screws, however, tend to mutilate the shank of the die and it is often very difficult to remove the die from the spindle and also difficult to insure the relocation of the die in the same position each time when it is desired, and one of the objects, therefore, of the present improvement is the provision of an improved tool holding device which will positively grip the shank of the die or similar type of tool in such manner that it will hold the same securely in place without the mutilation of the shank and will also permit the die to be quickly removed or replaced and, when replaced, located in precisely the same position relatively to the tool spindle as it was before being removed.

In the drawings accompanying and forming a part of this specification:

Similar characters of reference indicate corresponding parts in the several views.

Figure 1:
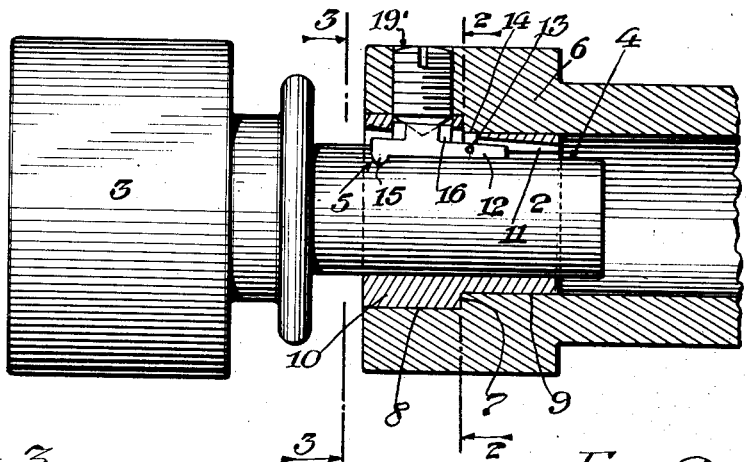
Figure 1 illustrates a threading die head and its shank and, in section, the end of a tool spindle having this improved tool holding device applied thereto.
Figure 3:
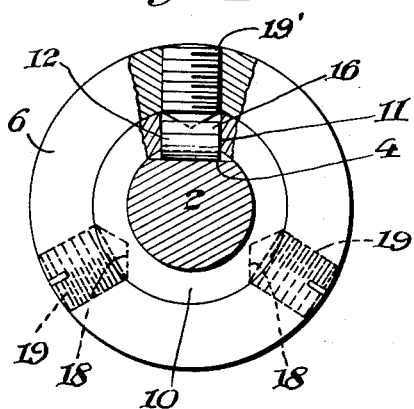
Fig. 3 is a cross-sectional view taken on line 3—3 of Fig. 1.
Figure 2:
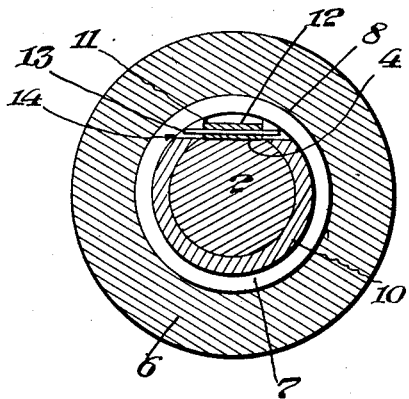
Fig. 2 is a cross-sectional view taken on line 2—2 of Fig. 1.
Figure 4:
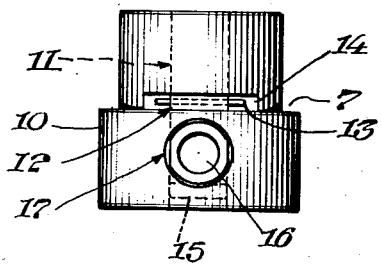
Fig. 4 is a top view of this improved tool holding device.
Figure 5:
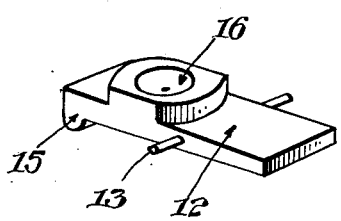
Fig. 5 is a detail perspective view of the gripping key or member.
Figure 6:
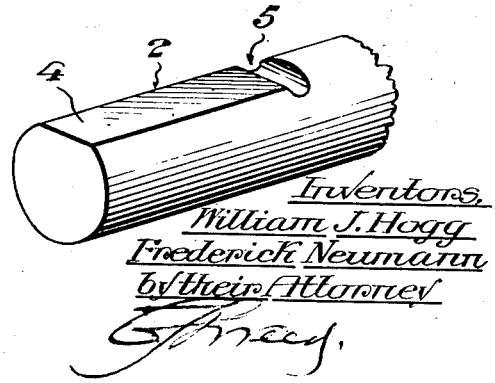
Fig. 6 is a perspective view of a part of the shank of a threading die.

Before explaining in detail the present improvement and mode of operation thereof, we desire to have it understood that the invention is not limited to the details of construction and arrangement of parts which are illustrated in the accompaning drawings, since the invention is capable of other embodiments, and that the phraseology which we employ is for the purpose of description and not of limitation.

In the preferred form thereof herein shown and described, the shank 2 of the threading die head 3 is slabbed off or flattened to provide a flat portion 4 terminating in a transversely-extending recess or groove 5. The end of the tool spindle 6 is bored to provide a shoulder 7, thus forming a bore at the end of the tool spindle of different diameters, as 8 and 9, and into this bore is fitted a shouldered or stepped bushing or sleeve 10 which is provided on its interior with a longitudinally-extending recess or slot 11 in which is pivotally located a gripping device or key 12 hinged to the bushing or sleeve by means of a pin 13, the removal of which pin permits the key to be removed. To facilitate the pivotal connection of these parts, the sleeve is provided in the rear of its shoulder with a transversely-extending groove or slot 14 intersecting and opening into the longitudinal slot 11 of the sleeve in such way that the projecting ends of the pin will rest on the bottom walls of the groove 14, thus permitting the key to have sufficient shiftable movement relative to its bushing or sleeve so as to engage the transversely-extending groove 5 in the shank of the die. The end of the key is provided with an enlarged or rounded projection 15 adapted to fit into the transversely-extending groove 5 of the die shank and is also provided with a countersunk portion or button 16 located in an opening 17 of the bushing, which bushing is also provided with a plurality of countersunk portions 18, shown as two in number, for the reception of the holding screws 19 carried by the tool spindle.

In operation the bushing or sleeve 10 is inserted into the tool spindle with the shoulders in juxtaposition and held therein by a pair of screws 19 engaging the countersunk portions 18 of the sleeve. The shank 2 of the die is then pushed into the bushing so that the rounded end of the key will fall into and engage the transverse groove 5 of the shank and lock the die in position, it being held in this position by a screw 19' similar to those that hold the bushing in the tool spindle, so that, on tightening up this screw 19', it will engage the countersunk button 16 of the key and firmly press it into engagement with the groove 5 of the die shank, at the same time assisting its companion screws 19 to hold the bushing in the tool spindle. When it is desired to release the die, it is only necessary to turn the screw 19' out until the key is released and thereupon the die can be readily removed.

From the foregoing it will be observed that one of the screws, as 19', that holds the bushing in position in the tool spindle is also utilized to hold the key into interlocking engagement with the die shank and that, by the simple release of this screw 19', the die can be readily removed and replaced in precisely the same position without the mutilation of the shank thereof by the ends of the screws, and that this one screw 19' is sufficient to positively grip and hold the die in position without the necessity of utilizing three screws, as heretofore, for clamping the shank of the die to the spindle, for the reason that the long bearing of the key crosswise of the die shank securely and positively holds the shank in position and yet this die and its shank can be quickly and easily removed and replaced in precisely the same position without the necessity of unscrewing three screws, as heretofore. In some instances, this improved gripping key mechanism can be applied directly to the end of the tool spindle without the necessity of an intermediate sleeve or bushing.

Practical use of this improved tool holding means has demonstrated that it efficiently and positively grips and holds the tool in position and prevents the die from pulling out of the die spindle in operation, and that it does away entirely with the mutilation of the shank of the tool or die, while very much facilitating the removal and replacement of the tool or die in the tool spindle and insuring the same location thereof in each instance.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A tool holding device comprising a bushing or sleeve having a longitudinally-extending slot on the interior thereof and an opening communicating therewith and a key located in said slot and shiftably supported by the bushing and provided with a countersunk button projecting into the opening of the bushing and adapted to be engaged by means for compressing the key into engagement with the shank of a tool.

2. A tool holding device comprising a bushing or sleeve having a longitudinally-extending slot on the interior thereof and an opening communicating therewith and a key located in said slot and shiftably supported by the bushing and provided with a countersunk button projecting into the opening of the bushing and adapted to be engaged by means for compressing the key into engagement with the shank of a tool, said key having a rounded end.

3. A tool holding device comprising a bushing or sleeve having a longitudinally-extending slot on the interior thereof and an opening communicating therewith and a key located in said slot and shiftably supported by the bushing and provided with a countersunk button projecting into the opening of the bushing and adapted to be engaged by means for compressing the key into engagement with the shank of a tool, said key having a rounded end and said bushing having a transverse slot communicating with said longitudinal slot for the reception of a pin for hinging the key to the bushing.

4. A tool holding device comprising a sleeve or bushing adapted for insertion into the bore of a tool spindle, a key shiftable carried by said sleeve for engaging the shank of a tool, said sleeve having an opening adjacent to said key and a countersunk portion, a screw carried by said tool spindle for engaging the countersunk portion of the sleeve, thereby to hold the sleeve in the spindle, and a screw also carried by said spindle and passing into the opening of the sleeve to engage the shiftable key, thereby to assist in holding the sleeve in the spindle and also clamp the key onto the shank of a tool.

5. A tool holding device comprising a sleeve or bushing adapted for insertion into the bore of a tool spindle, a key shiftably carried by said sleeve for engaging the shank of a tool, said sleeve having an opening adjacent to said key and a countersunk portion, a screw carried by said tool spindle for engaging the countersunk portion of the sleeve, thereby to hold the sleeve in the spindle, and a screw also carried by said spindle and passing into the opening of the sleeve to engage the shiftable key, thereby to assist in holding the sleeve in the spindle and also clamp the key onto the shank of a tool, said shank having a slabbed portion terminating in a transverse groove and said key having an enlarged end for projection into said groove.

6. The combination with a tool shank having a flat portion terminating in a transverse groove and a shouldered tool spindle having a plurality of threaded openings therein for the reception of locking screws, of a tool holder comprising a stepped bushing or sleeve having a countersunk portion and an opening for the reception of the ends of the locking screws thereby to secure the bushing in the spindle, and a shiftable key pivotally connected to the bushing and provided with an enlarged end for interlocking engagement with the transverse groove of the tool shank and with a countersunk button in register with the bushing opening for the reception of the end of one of said locking screws, whereby said screw will also compress the key into engagement with the shank of the tool.

7. The combination with a pair of tubular members, one insertable into the other, the inner member constructed to receive the shank of a tool and also having an interiorly-located, longitudinally-extending slot of a pivoted key located in said interior slot and having a part thereof registering with an opening in the outer member, and rotatable means carried in the opening of the outer member for engaging said key for compressing it onto the tool shank.

8. The combination with a pair of tubular members, one insertable into the other and having registering openings, the inner member constructed to receive the shank of a tool and also having an interiorly-located, longitudinally-extending slot, of a pivoted key located in the slot of the inner member and having a part thereof in position to register with said openings, said inner member also having a countersunk portion, means carried by the outer member for engaging said countersunk portion to lock the inner member thereto, and means carried in the opening of said outer member for engaging said key and effective to lock both tubular members together and also compress the key onto the shank of a tool.

9. The combination with a pair of tubular members, one insertable into the other and having registering openings, the inner member constructed to receive the slabbed shank of a tool having a transverse recess and also having an interiorly-located, longitudinally-extending slot, of a pivoted key located in the slot of the inner member and having a countersunk button in position to register with said openings and said key also having a projecting portion on its face for engaging the recess of the tool shank, said inner member also having a countersunk portion, means carried by the outer member for engaging said countersunk portion to lock the inner member thereto, and means carried in the opening of said outer member for engaging said key and effective to lock both tubular members together and also compress the key onto the shank of a tool.

10. The combination with a bored tool spindle for the reception of a tool shank and having an opening into the bore thereof and in communication with a longitudinally-extending slot, of a tool-holding device comprising a pivoted key located in said slot interiorly of said bored tool spindle to engage the tool shank, and a screw carried in the opening of the spindle for engaging said key thereby to cause the key to grip the tool shank within the spindle.

Signed at Cleveland, Ohio, this 23rd day of April, 1928.

WILLIAM J. HOGG.
FREDERICK NEUMANN.